United States Patent
Rivera et al.

(10) Patent No.: US 7,556,559 B2
(45) Date of Patent: Jul. 7, 2009

(54) CONTROL AND PRESSURE RELEASE VALVE

(75) Inventors: Alejandro Garza Rivera, Clarkston, MI (US); John J Mascarello, Livonia, MI (US); Christopher L Fulton, Fenton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 705 days.

(21) Appl. No.: 11/047,436

(22) Filed: Jan. 31, 2005

(65) Prior Publication Data
US 2006/0199528 A1     Sep. 7, 2006

(51) Int. Cl.
B60H 1/24      (2006.01)
F16K 15/16     (2006.01)

(52) U.S. Cl. .................. 454/162; 454/164; 454/165; 137/855; 137/858

(58) Field of Classification Search ............. 454/70, 454/359, 155, 103, 115, 162, 164–165; 137/39, 137/47, 115.2, 512.1, 512.2, 512.3
See application file for complete search history.

(56) References Cited

U.S. PATENT DOCUMENTS

| | | | |
|---|---|---|---|
| 4,131,970 A | * | 1/1979 | Le Van .................... 16/270 |
| 5,105,849 A | * | 4/1992 | Clough .................. 137/512.15 |
| 5,117,860 A | * | 6/1992 | Horner, Jr. .............. 137/512.1 |
| 5,194,038 A | * | 3/1993 | Klomhaus et al. .......... 454/162 |

* cited by examiner

Primary Examiner—Steve McAllister
Assistant Examiner—Helena Kosanovic

(57) ABSTRACT

A control and pressure relief valve for relieving pressure from an automotive vehicle interior to an atmospheric pressure outside the vehicle interior in accordance with the present invention includes a valve mounting location having an inlet in fluid communication with the vehicle interior and an outlet selectively in fluid communication with the atmospheric pressure. At least one relief valve mounted on the valve mounting location allows air to flow from the vehicle interior to atmospheric pressure when the air pressure in the vehicle interior exceeds a first predetermined pressure value that is greater than the atmospheric pressure. At least one control valve mounted on the valve mounting location allows air to flow from the vehicle interior to the atmospheric pressure when an air pressure in the vehicle interior exceeds a second predetermined pressure value that is greater than the atmospheric pressure and less than the first predetermined pressure value.

10 Claims, 3 Drawing Sheets

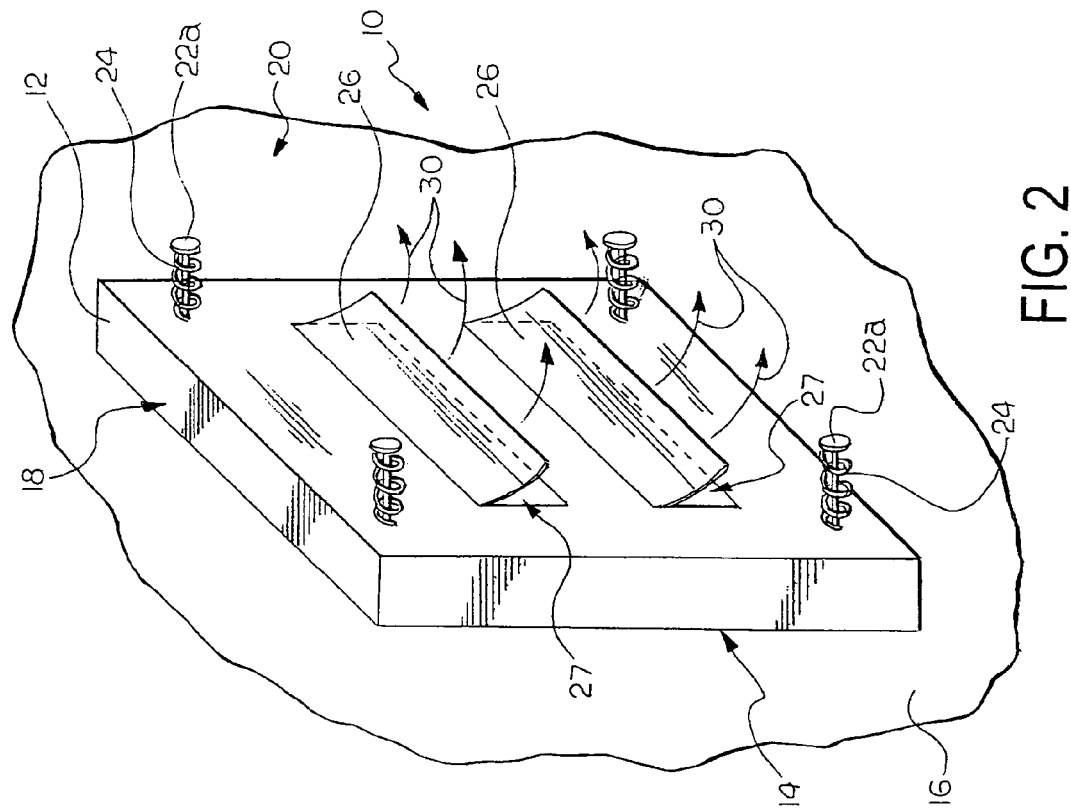
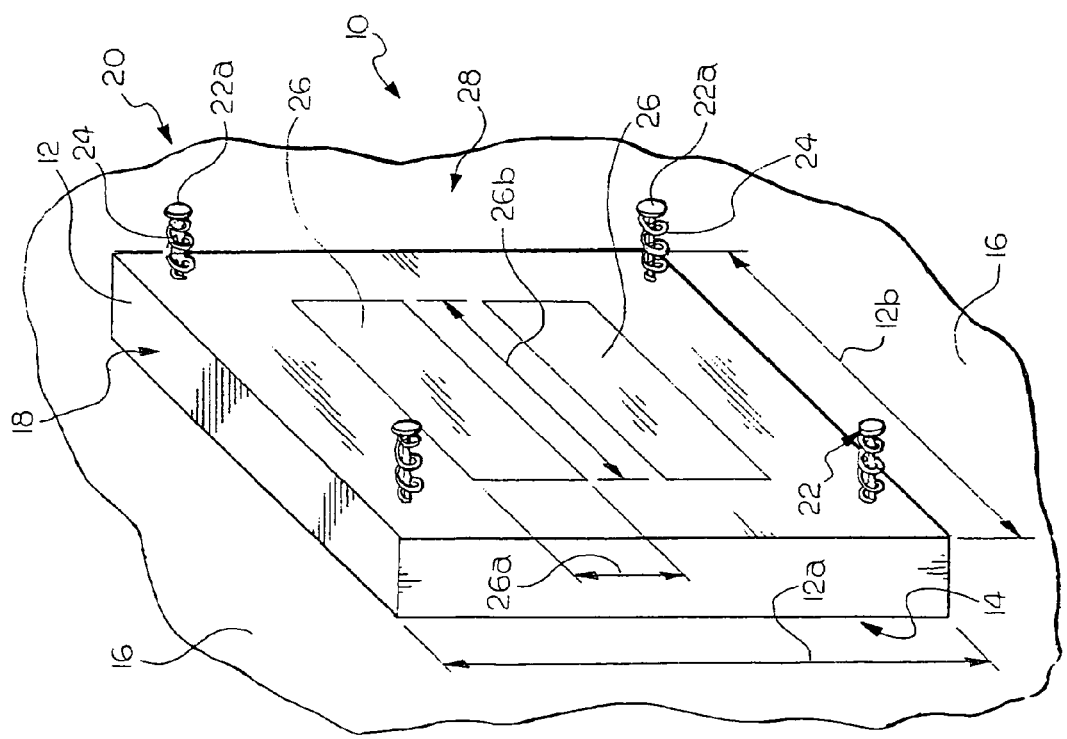

CONTROL AND PRESSURE RELEASE VALVE

BACKGROUND OF THE INVENTION

The present invention relates generally to heating, ventilation and air conditioning (HVAC) systems for automotive vehicles and, in particular, to a control and pressure relief valve for relieving pressure from an automotive vehicle interior to an atmospheric pressure outside the vehicle interior.

Automotive HVAC systems provide cooled or heated pressurized air to an automotive vehicle interior and typically include a control valve to relieve pressure from within the vehicle interior to atmospheric pressure during operation of the HVAC system to control air flow in the automotive vehicle interior and keep the automotive interior pressure and atmospheric pressures substantially balanced. The control valves of the HVAC systems, however, are disadvantageously not able to relieve pressure quickly when the automotive interior pressure rises quickly, such as when a door, a deck lid, or the like is closed.

It is desirable, therefore, to provide a valve to relieve pressure from the automotive interior during operation of the of the HVAC system and when the automotive interior pressure rises quickly.

SUMMARY OF THE INVENTION

The present invention concerns a control and pressure relief valve for relieving pressure from an automotive vehicle interior to an atmospheric pressure outside the vehicle interior. The control pressure and relief valve includes a valve mounting location having an inlet in fluid communication with the vehicle interior and an outlet selectively in fluid communication with the atmospheric pressure. At least one relief valve is mounted on the valve mounting location and is operable to allow air to flow from the vehicle interior to atmospheric pressure when the air pressure in the vehicle interior exceeds a first predetermined pressure value that is greater than the atmospheric pressure. At least one control valve is mounted on the valve mounting location and is operable to allow air to flow from the vehicle interior to the atmospheric pressure when an air pressure in the vehicle interior exceeds a second predetermined pressure value that is greater than the atmospheric pressure and less than the first predetermined pressure value.

The control and pressure relief valve in accordance with the present invention advantageously provides a combined pressure control valve with a quick release valve to allow the vehicle compartment pressure to release at a variable rate, during operation of the HVAC system, and a quick release relief valve to release instantaneous high vehicle interior pressure such as during door closing or the like. By combining the control and relief valve, the present invention also reduces both the overall number of components of and the overall mass of the HVAC system and thereby reduces the cost of the HVAC system.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a perspective view of a control and pressure relief valve in accordance with the present invention shown in a valve closed position;

FIG. 2 is a perspective view of the control and pressure relief valve of FIG. 1 shown in a control valve open position;

DESCRIPTION OF THE PREFERRED EMBODIMENT

Figure 3:
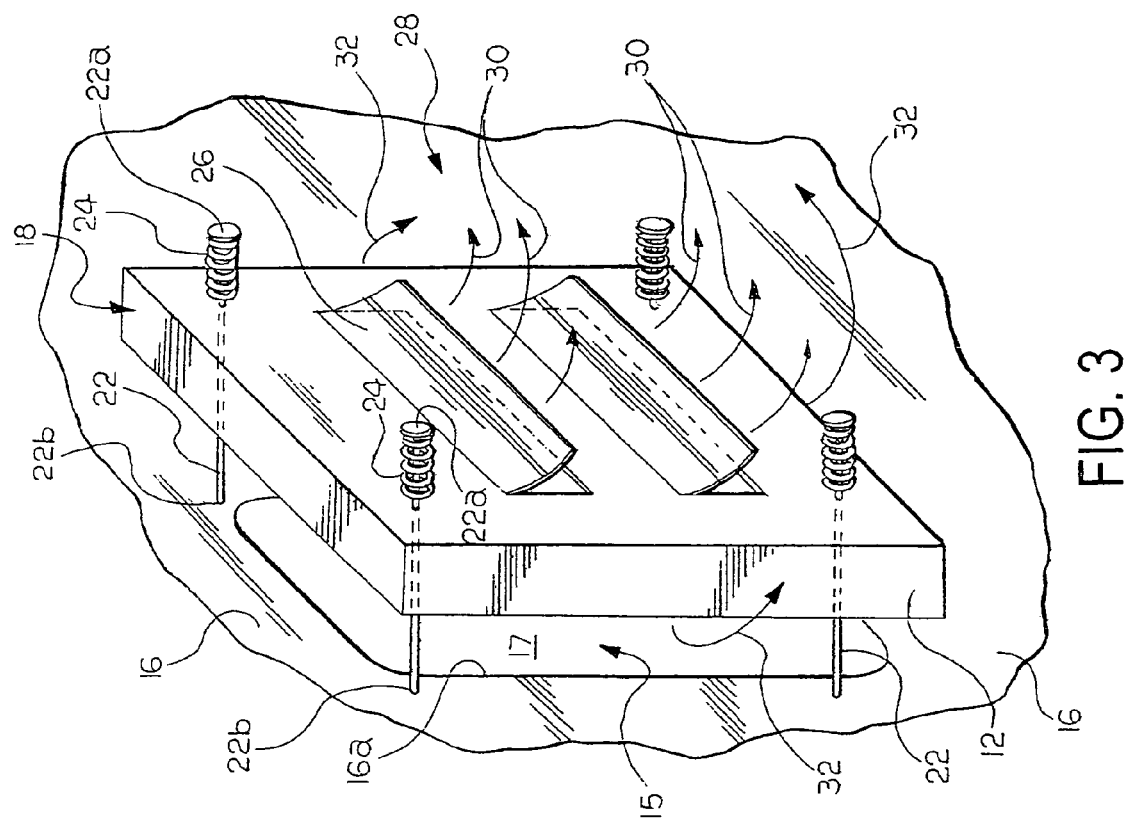
FIG. 3 is a perspective view of the control and pressure relief valve of FIG. 1 shown in the control valve open position of FIG. 2 and a relief valve open position.

Referring now to FIGS. 1-3, a control and pressure relief valve in accordance with the present invention is indicated generally at 10. The control and pressure relief valve 10 includes a substantially rectangular frame member 12 mounted on a mounting location 14 on a vehicle body, indicated schematically at 16. An inlet of the mounting location 14 is adjacent an opening 15 defined by an edge 16a of the vehicle body 16 that is in fluid communication with a vehicle interior, indicated schematically at 17, of the vehicle body 16, best seen in FIG. 3. The vehicle interior 17 includes a HVAC system (not shown) that is operable to pressurize the vehicle interior 17. Although the frame member 12 is shown in a substantially rectangular shape, those skilled in the art will appreciate that the frame member 12 may be formed in any shape advantageous for relieving pressure from the vehicle interior 17 to an atmospheric pressure, discussed in more detail below, including round, triangular or the like to accommodate packaging concerns for the vehicle body 16. An outlet of the mounting location 14 and the surface of the frame member 12 opposite the vehicle body 16 is outside the vehicle interior 17 and open to atmospheric pressure outside the vehicle body 16.

The frame member 12 defines a relief valve, indicated generally at 18 and discussed in more detail below. The frame member 12 is biased against the mounting location 14 by a spring-biased retaining feature, indicated generally at 20. The retaining feature 20 includes a plurality of posts 22 having a first end 22a mounted on respective corners of the frame member 12 and a second end 22b, best seen in FIG. 3, mounted on the mounting location 14 of the vehicle body 16. A corresponding plurality of springs 24 is disposed between the first end 22a of the post 22 and an outer surface of the frame member 12. The springs 24 are preferably compression springs. While the retaining feature 20 is shown as a plurality of posts 22 and springs 24 on respective corners of the frame member 12, those skilled in the art will appreciate that the retaining feature 20 may include other biasing devices while remaining within the scope of the present invention.

A pair of louvers 26 is disposed on the outer surface of the frame member 12. The louvers 26 define a control valve, indicated generally at 28 and discussed in more detail below. The louvers 26 each cover an opening 27, best seen in FIG. 2, formed in the outer surface of the frame member 12 and have an interior surface in fluid communication with the vehicle interior 17 and an exterior surface open to the atmospheric pressure outside the vehicle body 16. The louvers 26 are preferably a passive type check valve that allow air to flow outwardly from the vehicle interior 17 through the openings 27 to atmosphere during operation of the control and pressure relief valve 10, discussed in more detail below. While two louvers 26 are shown, those skilled in the art will appreciate that more or fewer than two louvers 26 may be provided, while remaining within the scope of the present invention.

As can be seen in FIG. 1, the louvers 26 of the control valve 28 define a working area defined by a length 26a and a width 26b of each of the louvers 26. The frame member 12 of the relief valve 18 defines a working area defined by a length 12a and a width 12b of the frame member 12. The working area of the relief valve 18, therefore, is greater than the working area of the control valve 28. The working areas of the control valve 28 and the relief valve 18 are each sized to allow a predetermined amount of air to flow therethrough for a given pressure difference between the vehicle interior 17 and outside the vehicle body 16. Because of its greater working area, the relief valve 18 is operable to allow a greater amount of air to flow therethrough than is the control valve 28.

In operation, the control and pressure relief valve 10 is mounted to the mounting location 14 and the HVAC system is operated, causing the pressure in the vehicle interior 17 to rise to a predetermined value that is greater than the atmospheric pressure outside the vehicle body 16. When this occurs, the louvers 26 of the control valve 28 move from a control valve closed position, shown in FIG. 1, to a control valve open position, shown in FIG. 2. In the control valve open position, the air from the vehicle interior 17 flows through the openings 27 to the atmospheric pressure outside the vehicle body 16 in a direction indicated by arrows 30.

When a door (not shown), a deck lid (not shown), or the like is closed, the pressure in the vehicle interior 17 rises quickly. The louvers 26 of the control valve 28 will open (as detailed above) if the pressure in the vehicle interior 17 is greater than the predetermined value. In addition, if the pressure in the vehicle interior 17 rises above to another predetermined value, which is greater than the predetermined value at which the louvers 26 of the control valve 28 open, the frame member 12 of the relief valve 18 will open. When this occurs, the frame member 12 of the relief valve 18 moves from a relief closed position, shown in FIGS. 1 and 2, to a relief valve open position, shown in FIG. 3, where the springs 24 are compressed between the outer surface of the frame member 12 along the posts 22, moving the outer surface of the frame member 12 away from the mounting location 14. In the relief valve open position, the air from the vehicle interior 17 flows through the opening 15 to the atmospheric pressure outside the vehicle body 16 in a direction indicated by arrows 32. When the pressure in the vehicle interior 17 drops below the another predetermined value, the springs 24 return the relief valve 18 to the relief valve closed position. The relief valve 18, therefore, functions as a passive check valve, opening and closing based on the air pressure of the vehicle interior 17.

The pressure at which the relief valve 18 will open is determined by the working area of the frame member 12 and the spring tension of the springs 24. As will be appreciated by those skilled in the art, the size of the frame member 12 may be chosen to define a working area at which a pressure exerted on the working area of the frame member 12 will exceed a force exerted by each of the springs 24 to allow the frame member 12 to move to the relief valve open position. Likewise, the springs 24 may be chosen to provide a predetermined force on the frame member 12 to not allow the frame member 12 to move until the pressure exerted on the working area of the frame member 12 exceeds that force. For example, an adjustment nut (not shown) or the like may be provided on the first end 22a of the posts 22 to allow for the spring-biased retaining feature 20 to be adjusted vary the second predetermined value at which the relief valve 18 will open.

Similarly, the size of the louvers 26 may be chosen to define a working area at which a pressure exerted on the working area of the louvers 26 will allow the louvers 26 to allow air to flow from the vehicle interior 17 to the atmospheric pressure outside the vehicle body 16.

Those skilled in the art will appreciate that more than one relief valve 18 may be mounted on the mounting location 24 and that the relief valves 18 and their corresponding mounting locations 24 may be located adjacent one another or spaced apart from one another, while remaining within the scope of the present invention.

Figure 4:
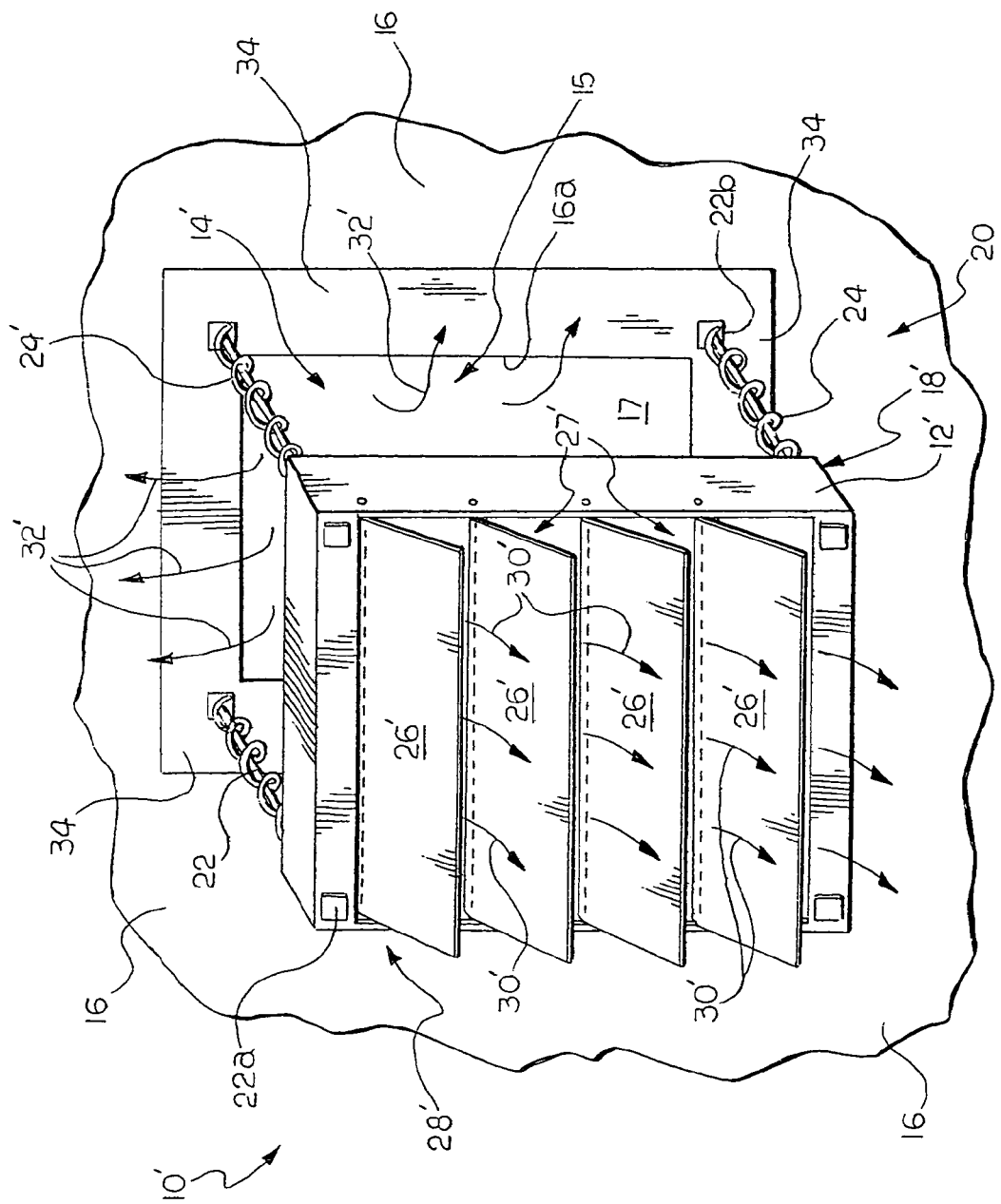
FIG. 4 is a perspective view of an alternative embodiment of a control and pressure relief valve in accordance with the present invention shown in a control valve open position and a relief valve open position.

Referring now to FIG. 4, an alternative embodiment of a control and pressure relief valve in accordance with the present invention is indicated generally at 10'. The control and pressure relief valve 10' includes a substantially rectangular frame member 12' mounted on a mounting location 14' that includes a mounting plate 34 attached to the vehicle body 16. An inlet of the mounting location 14' is adjacent the opening 15 defined by the edge 16a of the vehicle body 16 that is in fluid communication with the vehicle interior 17. An outlet of the mounting location 14' and the surface of the frame member 12' opposite the vehicle body 16 is outside the vehicle interior 17 and open to atmospheric pressure outside the vehicle body 16.

The frame member 12' defines a relief valve, indicated generally at 18' and discussed in more detail below. The frame member 12' is biased against the mounting location 14' by the spring-biased retaining feature having the plurality of posts 22 with the respective first ends 22a mounted on respective corners of the frame member 12' and the respective second ends 22b mounted on the mounting location 14' of the vehicle body 16. A corresponding plurality of springs 24' is disposed between the second end 22b of the post 22 and an inner surface of the frame member 12'. The springs 24' are preferably tension springs.

A plurality of louvers 26' is disposed on the outer surface of the frame member 12'. The louvers 26' define a control valve, indicated generally at 28' and discussed in more detail below. The louvers 26' each cover an opening 27' formed in the outer surface of the frame member 12' and have an interior surface in fluid communication with the vehicle interior 17 and an exterior surface open to the atmospheric pressure outside the vehicle body 16. The louvers 26' are preferably a passive type check valve that allow air to flow outwardly from the vehicle interior 17 through the openings 27' to atmosphere during operation of the control and pressure relief valve 10, discussed in more detail below. The louvers 26' of the control valve 28' define a working area similar to the working area defined by the louvers 26 of FIGS. 1-3 and the frame member 12' of the relief valve 18' defines a working area similar to the working area defined by the frame member 12 of FIGS. 1-3. The working area of the relief valve 18', therefore, is greater than the working area of the control valve 28' but the difference between the working area of the relief valve 18' and the control valve 28' is less than the difference between the working area of the relief valve 18 and the control valve 28. The working areas of the control valve 28' and the relief valve 18' are each sized to allow a predetermined amount of air to flow therethrough. Because of its greater working area, the relief valve 18' is operable to allow a greater amount of air to flow therethrough than is the control valve 28'.

In operation, the control and pressure relief valve 10' is mounted to the mounting location 14' and the HVAC system is operated, causing the pressure in the vehicle interior 17 to rise to a predetermined value that is greater than the atmospheric pressure outside the vehicle body 16. When this occurs, the louvers 26' of the control valve 28 move from a control valve closed position (not shown) to a control valve open position shown in FIG. 4, wherein the air from the vehicle interior 17 flows through the openings 27' to the atmospheric pressure outside the vehicle body 16 in a direction indicated by arrows 30'.

When a door (not shown), a deck lid (not shown), or the like is closed, the pressure in the vehicle interior 17 rises quickly. The louvers 26' of the control valve 28' will open (as detailed above) if the pressure in the vehicle interior 17 is greater than the predetermined value. In addition, if the pressure in the vehicle interior 17 rises above to another predetermined value, which is greater than the predetermined value at which the louvers 26' of the control valve 28' open, the frame member 12' of the relief valve 18' will open. When this occurs, the frame member 12' of the relief valve 18' moves from a relief closed position (not shown) to a relief valve open position, shown in FIG. 4, where the tension springs 24' are extended from the vehicle body 16 along the posts 22, moving the outer surface of the frame member 12' away from the mounting location 14'. In the relief valve open position, the air from the vehicle interior 17 flows through the opening 15 to the atmospheric pressure outside the vehicle body 16 in a direction indicated by arrows 32'. When the pressure in the vehicle interior 17 drops below the another predetermined value, the springs 24' return the relief valve 18' to the relief valve closed position. The relief valve 18', therefore, functions as a passive check valve, opening and closing based on the air pressure of the vehicle interior 17.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A control and pressure relief valve for relieving air pressure from an automotive vehicle interior to an atmospheric pressure outside said vehicle interior, said valve adapted to be mounted on a valve mounting location, said valve mounting location having an inlet in fluid communication with said vehicle interior and an outlet in fluid communication with said atmospheric pressure, comprising:
    a frame member defining at least one relief valve disposed in said mounting location and operable to allow air to flow from said vehicle interior to atmospheric pressure when said air pressure in said vehicle interior exceeds a first predetermined pressure value, said first predetermined pressure value being greater than said atmospheric pressure, said frame member biased by springs disposed between said valve mounting location and said frame member, said frame member selectively sealing said valve mounting location inlet; and
    at least one louver defining a control valve disposed in said frame and operable to allow air to flow from said vehicle interior to said atmospheric pressure when said air pressure in said vehicle interior exceeds a second predetermined pressure value, said second predetermined value being greater than said atmospheric pressure and less than said first predetermined pressure value.

2. The valve according to claim 1 wherein said valve mounting location inlet defines a single aperture and said at least one control valve and said at least one relief valve are disposed in said single aperture.

3. The valve according to claim 1 wherein said springs are adjustable to vary said first predetermined pressure value.

4. A control and pressure relief valve for relieving air pressure from an automotive vehicle interior to an atmospheric pressure outside the vehicle interior, comprising:
    a valve mounting location having an aperture with an inlet in fluid communication with the vehicle interior and an outlet selectively in fluid communication with the atmospheric pressure;
    a relief valve including a plurality of posts mounted to and extending from the valve mounting location, a frame member slidably mounted on the plurality of posts and selectively covering and sealing against the aperture, and a spring configured to bias the frame member into contact with the valve mounting location, the relief valve being operable to allow air to flow from the vehicle interior to atmospheric pressure when the air pressure in the vehicle interior exceeds a first predetermined pressure value, the first predetermined pressure value being greater than the atmospheric pressure; and
    a control valve mounted on the frame member and configured to allow air to flow from the vehicle interior to the atmospheric pressure when the air pressure in the vehicle interior exceeds a second predetermined pressure value, the second predetermined pressure value being greater than the atmospheric pressure and less than the first predetermined pressure value.

5. The valve according to claim 4 wherein the control valve is a louver pivotally mounted on the frame member.

6. The valve according to claim 4 wherein the spring is adjustable to vary the first predetermined pressure value.

7. The valve according to claim 4 wherein the spring is mounted between the frame member and the valve mounting location.

8. The valve according to claim 4 wherein the spring is mounted between the frame member and a free end of one of the plurality of posts.

9. The valve according to claim 4 wherein the control valve is a pair of louvers, each pivotally mounted on the frame member.

10. The valve according to claim 4 wherein the spring is one of a plurality of springs, with each of the plurality of springs mounted on a respective one of the plurality of posts.

* * * * *